E. J. DOYLE.
COMBINED VELOCIPEDE AND WAGON.
APPLICATION FILED AUG. 18, 1919.
1,346,596.
Patented July 13, 1920.
2 SHEETS—SHEET 1.
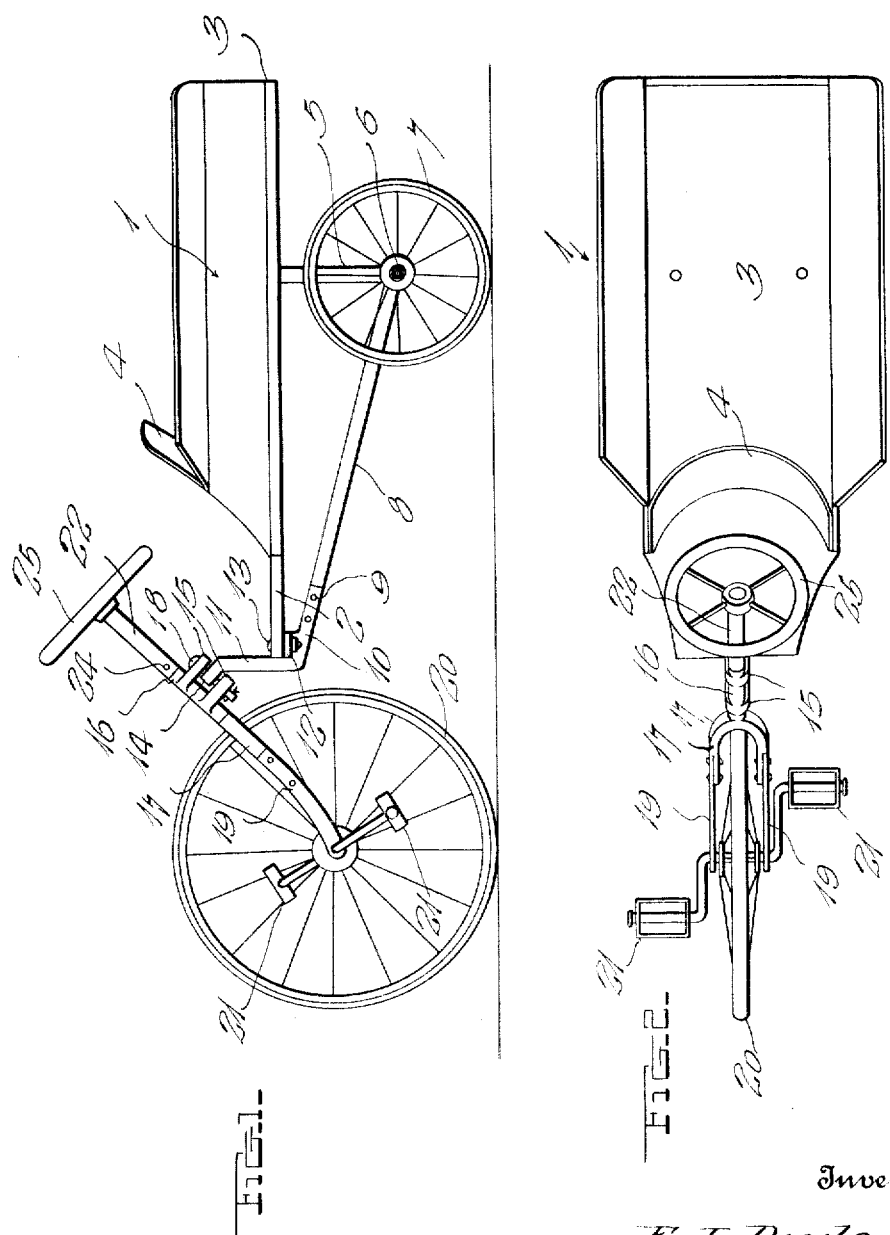
Inventor
E. J. Doyle,
Witness
J. R. Pierce
By H. B. Willson & Co.
Attorneys

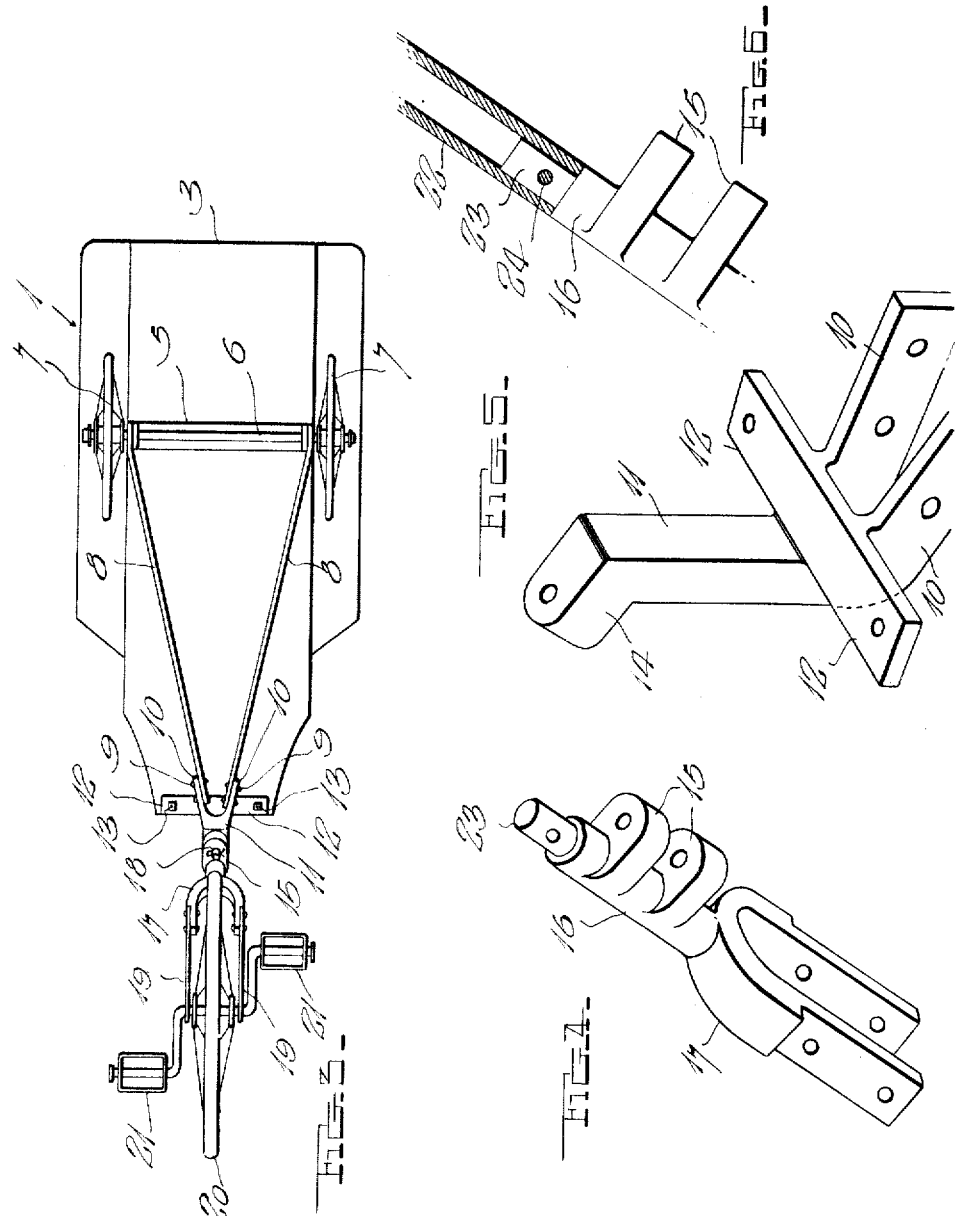

UNITED STATES PATENT OFFICE.

ELMER JOE DOYLE, OF DETROIT, MICHIGAN.

COMBINED VELOCIPEDE AND WAGON.

1,346,596.  Specification of Letters Patent.  Patented July 13, 1920.

Application filed August 18, 1919. Serial No. 318,240.

*To all whom it may concern:*

Be it known that I, ELMER J. DOYLE, a citizen of the United States, residing at Detroit, in the county of Wayne and State of Michigan, have invented certain new and useful Improvements in Combined Velocipedes and Wagons; and I do declare the following to be a full, clear, and exact description of the invention, such as will enable others skilled in the art to which it appertains to make and use the same.

My invention has for its principal object to provide a simply constructed and inexpensive velocipede and wagon for light hauling, the device being particularly well adapted for the delivery of newspapers and groceries, though usable for numerous other purposes.

In carrying out the above end, further objects are to form the operator's seat by the front end of the wagon box bottom; to provide a single member serving as a back for the seat and a front for the wagon box; to provide a novel anchorage for the front end of the box bottom, and to provide an extremely simple and efficient frame structure for the device.

With the foregoing in view, the invention resides in the novel features of construction and unique association of parts hereinafter fully described and claimed, the descriptive matter being supplemented by the accompanying drawings which form a part of this application.

Figure 1 is a side elevation of a combined wagon and velocipede constructed in accordance with my invention.

Fig. 2 is a top plan view.

Fig. 3 is a bottom plan view.

Fig. 4 is a perspective view of the upper portion of the fork.

Fig. 5 is a perspective of the hanger by which the rear portion of the frame structure is connected with the fork at the front of the device.

Fig. 6 is a detail section showing the manner in which the spring post is attached to the fork shank.

In the drawings above briefly described, the numeral 1 designates a wagon box of any preferred construction, the front end 2 of the box bottom 3 being shaped to form a seat for the operator. A seat back 4 rises from the bottom 3 and also forms a front for the box. The rear end of the box 1 is supported by an arched bracket or the like 5 from a rear axle 6 having wheels 7 which are preferably rubber-tired as shown. A pair of longitudinal bars 8 incline upwardly and forwardly from the axle 6 and converge toward their front ends, said ends being secured by rivets or the like 9 to a pair of arms 10 which are integral with and diverge rearwardly from the lower end of a vertical hanger bar 11. A transverse attaching bar 12 is integral with the upper edges of the arms 10 and is also by preference joined integrally to the bar 11, and by bolts or the like 13, the front end of the box bottom 3 is secured to said bar 12.

The upper end of the hanger bar 11 is provided with a lug 14 which inclines outwardly and forwardly and is received between rearwardly projecting lugs 15 on the inclined shank 16 of a fork casting 17, a suitable pin 18 being passed through the three parts 14 and 15 for pivoting them together. Fork arms 19 are riveted or otherwise secured to the head 17 and carry a relatively large front wheel 20 having pedals 21. A tubular steering post 22 receives a projecting stud 23 on the upper end of the fork shank 16 and may be secured thereto by a pin 24 or any other preferred means, and although I have shown a steering wheel 25 on the upper end of said post, it is to be understood that any other preferred steering device could be used.

By constructing the device in the manner shown, it may be easily and inexpensively manufactured and marketed and will be highly efficient and desirable. Particular emphasis is laid upon the fact that the seat back 4 forms the front end of the wagon box 1, and the front end of the box bottom 3 forms the seat 2. The novel frame structure including the hanger bar 11 with its fork arms 10 and the transverse bar 12 to which the bottom 3 is secured, is also of importance in that it is strong and efficient, regardless of the fact that it is simple and inexpensive. Since probably the best results may be obtained from these details, they may well be followed, but within the scope of the invention as claimed, numerous minor changes may well be made.

I claim:

1. In a combined velocipede and wagon, a front wheel having pedals, a fork mounted on said wheel and having steering means at the upper end of its shank, a hanger depending from and pivoted to said shank, rearwardly diverging bars secured to the lower end of said hanger, an axle to which the rear ends of said bars are attached, wheels on said axle, a combined load carrier and driver's seat secured at its front end to said hanger, and means supporting the rear end of said combined carrier and seat from said axle.

2. In a combined velocipede and wagon, a front wheel having pedals, a fork mounted on said wheel and having steering means on the upper end of its shank, a hanger pivoted to said shank, said hanger having a transverse attaching bar at its lower end, rearwardly diverging bars secured to said hanger at their front ends, a wheeled axle to which the rear ends of said diverging bars are connected, a combined driver's seat and load carrier secured to said transverse attaching bar at its front end, and means supporting the rear end of said combined seat and carrier from said axle.

3. In a combined velocipede and wagon, a front wheel having pedals, a fork mounted on said wheel and having steering means on the upper end of its shank, a hanger bar depending from and pivoted to said shank, the lower end of said hanger bar having rearwardly diverging arms and a transverse attaching bar integral with said arms, a pair of rearwardly diverging bars secured at their front ends to said arms, a wheeled axle with which the rear ends of said bars are connected, a combined driver's seat and load carrier secured at its front end to said attaching bar, and means for supporting the rear end of said combined seat and carrier from said axle.

4. In a combined velocipede and wagon, a front wheel having pedals, a fork mounted on said wheel and having steering means on the upper end of its shank, a hanger bar depending from and pivoted to said shank, the lower end of said hanger bar having rearwardly diverging arms and a transverse attaching bar integral with said arms, a pair of rearwardly diverging bars secured at their front ends to said arms, a wheeled axle with which the rear ends of said bars are connected, a wagon box whose bottom extends forwardly beyond its sides to form a driver's seat, a back for said seat forming the front wall of said box, means for securing the front end of said box bottom to said attaching bar, and means for supporting the rear end of said bottom from said axle.

In testimony whereof I have hereunto set my hand.

ELMER JOE DOYLE.